Figure 1:
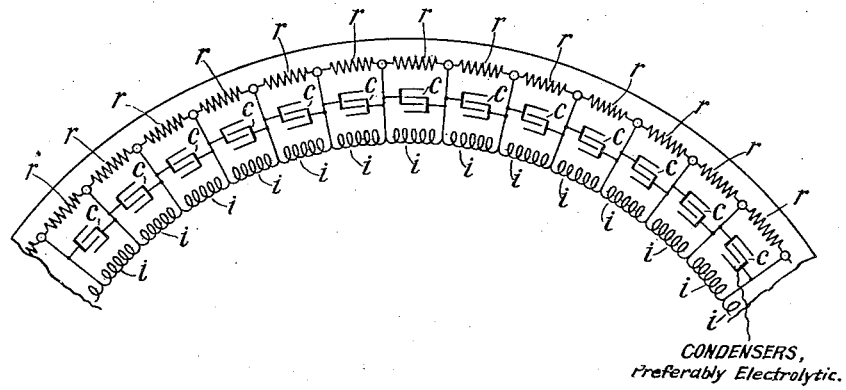

R. D. MERSHON.
INDUCTION MOTOR AND GENERATOR.
APPLICATION FILED APR. 29, 1905.

911,147.

Patented Feb. 2, 1909.

3 SHEETS—SHEET 1.

CONDENSERS,
Preferably Electrolytic.

CONDENSERS,
Preferably Electrolytic.

Witnesses
Raphaël Netter
S. S. Dunham

Inventor
Ralph D. Mershon
By his Attorneys,
Kerr, Page & Cooper

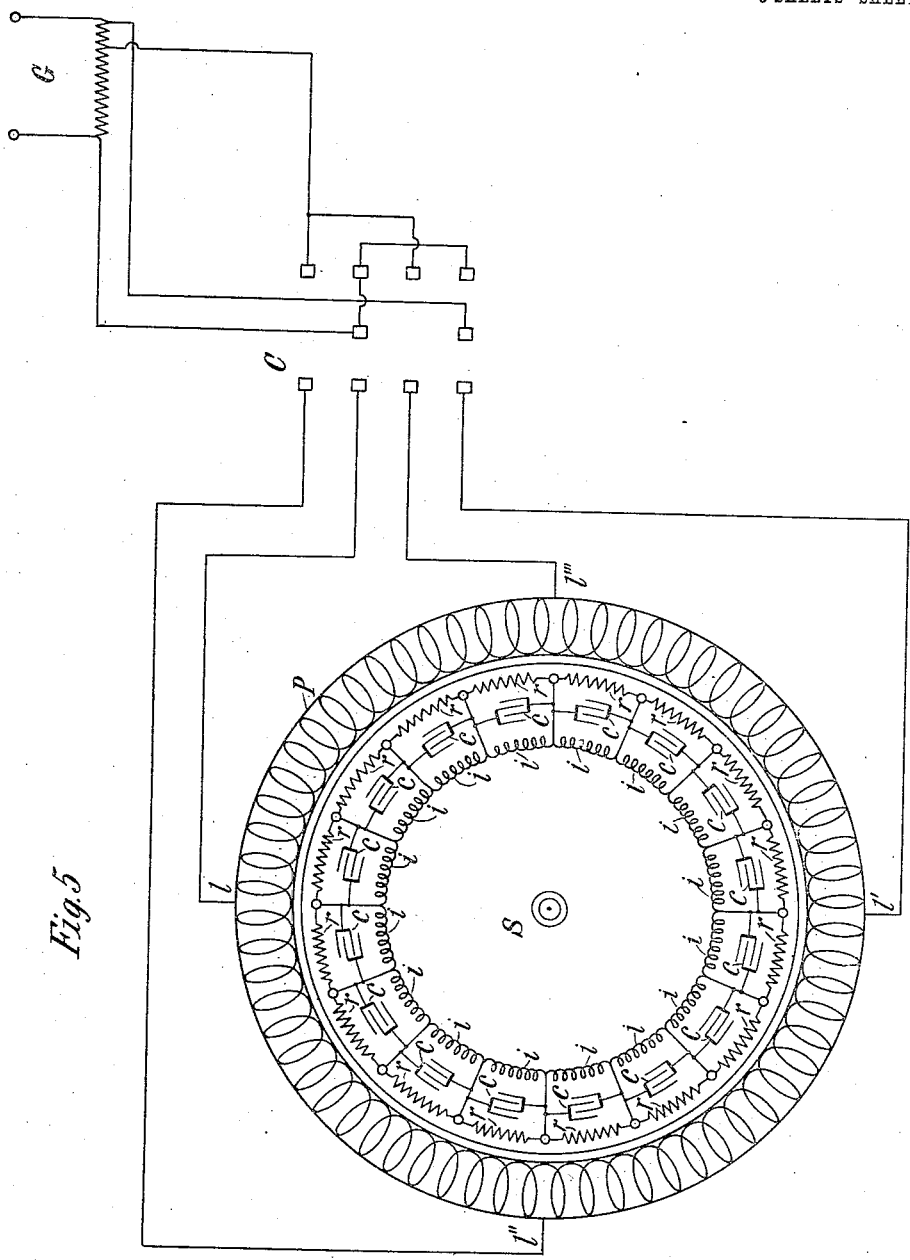

UNITED STATES PATENT OFFICE.

RALPH D. MERSHON, OF NEW YORK, N. Y.

INDUCTION MOTOR AND GENERATOR.

No. 911,147.  Specification of Letters Patent.  Patented Feb. 2, 1909.

Application filed April 29, 1905. Serial No. 257,991.

*To all whom it may concern:*

Be it known that I, RALPH D. MERSHON, a citizen of the United States, residing at New York, in the county and State of New York, have invented certain new and useful Improvements in Induction Motors and Generators, of which the following is a specification, reference being had to the drawing accompanying and forming a part of the same.

My invention relates to alternating current machines of the inductive type, both motors and generators, and has for its chief object to improve the operation of such machines. In view of the well known reversibility of the induction motor, in that when driven above synchronism it will act as a generator and deliver power to the circuit to which it may be connected, the following description will, for the sake of brevity and simplicity, be confined to the motor; but it will be recognized by those skilled in the art that the invention is applicable to generators as well.

In the induction motor, as in a transformer, there is always a certain amount of stray magnetic field, around the primary and around the secondary windings,—that is to say, a certain amount of magnetic flux which is not common to both windings. Under running conditions this stray field is not a serious drawback, but it is a disadvantage under conditions of starting, in that for a given torque the power factor of the motor in starting is considerably less than when exerting full torque under normal running conditions. One method of overcoming this defect is to employ in the secondary, at starting, a resistance, which is usually cut out by means of switches, automatically or otherwise actuated, as the motor comes up to speed. Switching devices, however, are objectionable for various reasons, and in order to avoid their use, there is sometimes employed in the secondary a permanently connected resistance, whose value is a compromise between that which would be best for running conditions (which value should, in general, be as near zero as possible) and that best for starting, which latter would, in the case of a motor intended to produce a high starting torque with least apparent energy to the motor, have a certain definite value, depending upon the design of the machine. But a compromise resistance is objectionable since it gives neither the best starting nor the best running conditions.

Another plan for improving the operation of the motor at starting is to use a condenser in the secondary, and this plan is quite advantageous from a number of standpoints. In the first place, the current taken by the condenser may be made to neutralize, or even overbalance entirely, the lagging current which the motor would otherwise take in starting. Furthermore, by means of the condenser the motor may be made to produce at starting, for a given impressed voltage, a torque greater even than with the use of the best starting resistance in the secondary. But even with a condenser it is in general desirable to have a resistance in shunt with it, through which the current representing the power component in the secondary could flow, although of course such resistance is not absolutely necessary.

In connection with the condenser in the secondary, switching devices may be employed for manipulating any resistance which may be used, and, if so desired, for manipulating the condenser also; but it is very desirable to avoid the use of switching devices, and I have therefore devised a plan for accomplishing approximately the same result as would be obtained by the use of switching devices automatically or manually operated for cutting out resistance, by means not involving any switching devices in the secondary circuit or circuits, and at the same time avoiding heavy lagging current at starting. This is the chief feature of my invention, and it may be stated broadly to consist in connecting impedance with the condenser, the two being connected preferably in multiple, in the secondary.

As before stated, the object of the condenser is to offset partially, wholly, or even overbalance, the lagging current taken by the motor at starting; and in the latter case to greatly increase the torque which could otherwise be obtained by resistances in the secondary, whether they be such as are cut out as the speed increases, or compromise resistances.

The effect of the condenser is maximum when starting, because then the voltage and frequency across its terminals are greatest; but as the motor increases in speed the voltage and frequency across the condenser terminals decrease, and the effect of the condenser diminishes. If at starting there be connected in shunt with the condenser an impedance or choking coil, it is possible to so adjust their relative values that the currents taken by them will be equal; and since their difference in current-phase is practically 180° the quadrature components in the two devices will be neutralized and the current supplied to the combination of condenser and impedance will be practically in step with the electromotive force impressed upon them. The condenser may, if desired, be so adjusted that its current will be either greater or less than that of the impedance, in which case the resultant current to the combination will be respectively leading or lagging, and in the former case, as before explained, there will result an increase of torque.

For the purpose of explanation let it be supposed that the currents have been made substantially equal, so that at starting the current to the combination is practically in step with the impressed electromotive force. As the speed of the motor increases the current in the condenser decreases rapidly, while that in the impedance falls off but slightly, the amount of its decrease being dependent upon the ratio of the resistance to the inductance of the impedance coil. However, the impedance current is all the time, as the speed rises, coming more closely into step with the impressed electromotive force. The result is that the resultant current to the combination will not at any speed be greatly lagging. At synchronism the current in both devices will be zero, but at speeds slightly below synchronous the current in the impedance may be high while that in the condenser will be small. However, since the reactance component of voltage in the impedance under these conditions is very low the current in the impedance will be very nearly in step with the electromotive force, so that the secondary current lags only a very small amount. The result is that at speeds near synchronism the secondary is practically short circuited, as is desired for such speeds. At speeds between synchronism and zero the current in the impedance will have departed considerably from unity power factor, but this will be more or less compensated for by the condenser thus keeping the power factor of the current to the combination from falling to too low a value. At zero speed the current to the combination will, as stated, be unity, because of the adjustment of values made for that purpose. When near synchronism, therefore, and at zero speed also, the current to the combination will be close to unity; but at intermediate speeds the power factor may depart more or less from unity.

If in addition to the condenser and impedance there be connected a properly proportioned resistance in shunt therewith, the current to the resistance will not only tend to improve the power factor when near synchronism but will also greatly improve it at intermediate speeds. At the same time the current to this resistance will be such as to increase the torque of the motor at any given slip, especially at zero speed or at other speeds considerably below synchronism. Under running conditions, therefore, the operation of the motor embodying my invention will closely approximate that of one with a short-circuited secondary, but at starting it will be free from the common objections to motors so constructed, in that the current taken by the motor due to the secondary current flowing will be, if desired, practically in step with the electromotive force.

If the impedance be over-compensated for by the condenser, as before mentioned, so that the resultant current to the combination is leading, the magnetizing current required by the motor from the mains will be less than it would be if such over-compensation were not present; and by carrying this over-compensation far enough it is possible not only to neutralize the magnetizing current entirely, which otherwise would be taken by the motor from the supply circuit, but also, if desired, to cause the motor to take a leading current from the supply. Under such conditions it will be seen that the power factor of the motor may be greater at intermediate speeds than it would be if the impedance current were not overbalanced, and at speeds near synchronism the beneficial effect of the condenser, though small, will be greater than under the condition just mentioned.

The plan thus described will answer with the ordinary condenser, but in order that the condenser shall not be objectionably large and costly the secondary of the motor will have to be wound for high voltages and the use of anything like a squirrel cage winding will be prohibited. This is not true, however, with a condenser of the electrolytic type, since such a condenser is inherently one demanding a low voltage; that is, the various elements of the condenser are operative at their full effectiveness for comparatively low voltage, and that very much lower than is ordinarily required for the usual form of condenser. The usual form of electrolytic condenser has in it a very high loss. In other words its efficiency is low, which makes its use objectionable in many cases where the ordinary electrostatic condenser could be employed. When used in the secondary of an induction motor, however, this characteristic of the electrolytic condenser is no longer objectionable, but is rather an advantage in that it is desirable to obtain in the secondary of an induction motor, under given conditions, as high a loss as possible. We are not, however, confined to the use of low voltages with such a condenser; since by putting the necessary number of elements in series a condenser may, if desired, be obtained which is operative at a high voltage.

Because of the low voltage required by the electrolytic condenser it may be used in connection with a squirrel cage winding or bar winding similar thereto, and when so used it may be either in parallel with a resistance, or with an impedance, or both, or may be used on a separate winding of its own. Where desirable there might even be three sets of windings on the secondary element,—one for use in connection with the condensers, one for the resistances, and one for the impedances.

If the electrolytic condenser be constructed to have sufficiently high loss the use of resistance in shunt with the condenser and the impedance, as described, may be avoided. It is to be understood that in any case, whether the electrolytic condenser be used or not, the use of resistance is not absolutely necessary, since we may depend on the resistance loss in the impedance coil as means for obtaining the loss in the secondary necessary for producing torque. Furthermore, if it be so desired, instead of employing the resistance in shunt with the condenser and impedance it may be put in series, though in general with less beneficial results.

When connected to separate windings the condenser, impedance, and resistance will perform their functions in starting, in like manner as described when they are connected to the same winding. But by connecting them to several windings there will result, in addition to structural advantages in certain cases, a further advantage in that the voltage impressed upon all the devices of the same kind will be largely independent of the stray fields due to the currents taken by the other devices.

From the foregoing the chief objects of the invention will be seen to be as follows:

First, to produce an induction motor which will adjust itself for favorable starting and running conditions. This I attain by employing a condenser and an impedance, as described, with or without a resistance.

Second, to obtain favorable starting or running conditions by means of a condenser which shall not involve the use of high voltages or complicated windings, but which will permit the employment of windings of the squirrel cage or bar type. This object I attain by the use of the electrolytic condenser.

The invention is shown diagrammatically in the annexed drawings, in which—

Figure 2:
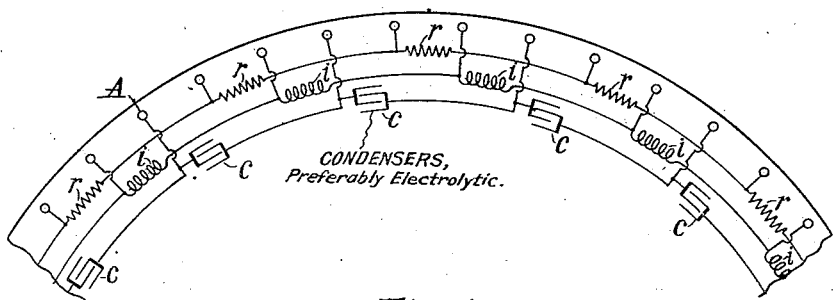
Figure 1A:
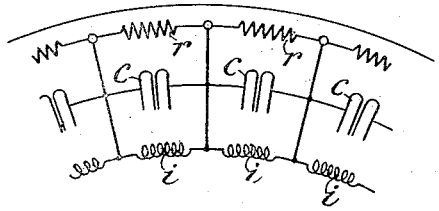
Figure 3:
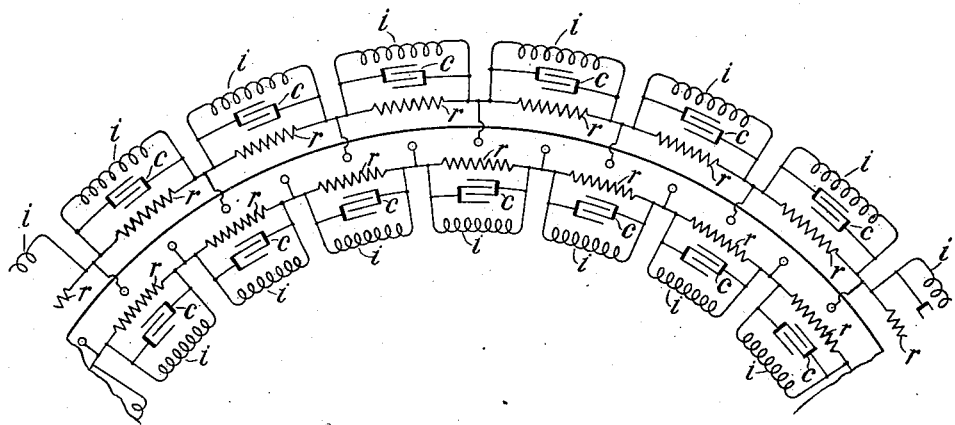
Figure 4:
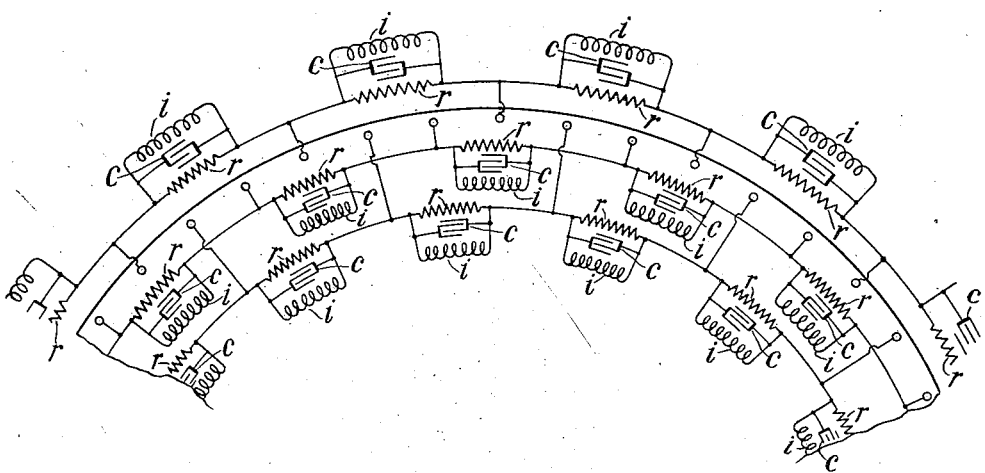

Figure 1 is an end view of a portion of a squirrel cage secondary element, showing condensers, impedances, and resistances connected in multiple to the same set of windings. Fig. 1$^a$ is a detail view of an arrangement like that of Fig. 1, showing condensers of the electrolytic type. Fig. 2 shows the condensers, impedances, and resistances connected to separate sets of windings. Fig. 3 shows a secondary with two sets of windings, each having its own set of condensers, impedances, and resistances, the two windings being arranged to overlap. Fig. 4 shows three overlapping windings, each having its own set of condensers, impedances, and resistances. Fig. 5 illustrates the invention embodied in a motor adapted to run at different speeds by varying the number of its poles.

Throughout the drawings, the condensers are indicated by $c$, impedances by $i$, and resistances by $r$, wherever they occur.

In Fig. 1 (and Fig. 1$^a$) the condensers, impedances and resistances are all connected to the same set of windings, like devices being in series with each other but in multiple with the remaining devices. In Fig. 2 the similar devices are also in series with each other but are connected to separate sets of windings. Thus, calling the bar indicated by A the first, the condensers are connected thereto and to every third bar therefrom, and the resistances and impedances to the intermediate bars respectively. The extent of the overlapping may be varied if desired, by making the different circuits extend over four, five or in general any number of bars, as may be most advantageous, under given conditions. In any case the voltage effective across the terminals of the devices will depend, other things being equal, upon the spacing of the circuits relative to the pole-pitch of the primary; the rule being, in general, up to and including the primary pole-pitch, that the wider the circuit the greater the voltage will be. Hence the voltage on the devices connected as in Fig. 2 will be much greater than in the arrangement shown in Fig. 1. The proper proportioning of the circuits, as well as the values of the devices used, may be readily effected by any one skilled in the art to which the invention pertains.

In Fig. 3 the secondary element has two sets of windings, composed of alternated bars. Each set of windings has connected with it complete sets of condensers, impedances, and resistances, the like devices being in series with each other and in multiple with the other kinds. In Fig. 4 there are three sets of windings, each provided with devices connected with each other as in Fig. 3. The use of overlapping circuits accomplishes the same results as regards voltage as before explained, so that the voltage in Fig. 4 would be greater than in Fig. 3, and in both greater than in Fig. 1.

The values to be given to the various devices will depend entirely on the results desired for the performance of the machine, but the necessary proportioning of the same may be readily made by the skilled engineer who applies the invention.

The mechanical details, as regards the manner of arranging the devices and connecting them with the motor, are immaterial, and are best left to the engineer who designs the apparatus. The devices may be located and secured in the secondary element itself, or they may be entirely outside of the same, or part of them outside, as desired, those outside being connected by means of slip-rings if the secondary is the moving element of the machine. Whichever plan is to be employed will in general be determined by what is most convenient or otherwise desirable under given conditions.

In the foregoing explanation nothing has been said with reference to the application of the invention to machines adapted for speed-control by varying the number of its poles, but it is clear that the invention is thus applicable. In fact it is of special value in apparatus of that character, as affording means for overcoming one, at least, of the principal drawbacks met with in machines adapted for such speed-control, namely, increase of magnetic leakage in such motors as the number of poles is increased. Furthermore, in addition to the fact that the general principles before explained are especially advantageous for variable-pole motors, the use of an electrolytic condenser, enabling as it does the application of these principles to squirrel cage or bar windings, is of particular importance in that such windings lend themselves more readily to the construction of variable-pole motors, since such windings accommodate themselves to any pole-pitch, and do so with special facility if the spacing of the bars be sufficiently small, so that the spacing is less than the small pole-pitch to be employed.

Fig. 5 shows a variable-pole motor, adapted to run with two and with four poles, thus giving two synchronous speeds. In this figure G indicates the source of current, which may be either single-phase, as shown, or polyphase. P is the primary of the machine, of any suitable kind, as for example the single ring winding shown. C is a diagrammatic controller. By tracing the connections it will be seen that in the first position of the controller two poles will be produced in the primary, the leads therefor being tapped in at 1 and 1'. In the next position, the number of poles is changed to four, produced by leads 1, 1', 1'', 1'''. The secondary element, S, shown in Fig. 5 is of the type illustrated in Fig. 1, that is, with the condensers, resistances, and impedances all connected to the same winding, but it is clear that any secondary embodying the principle of my invention may be employed in the motor and it is therefore unnecessary to repeat Fig. 5 merely to show different secondaries therein. It is also evident that the range of pole-numbers shown in Fig. 5, that is, two and four, is merely illustrative, and that the application of the invention is not limited thereto.

As I have already explained, the use of a resistance with the condenser and impedance, though generally advantageous, is not absolutely essential to the invention, especially where an electrolytic condenser is employed; and though the resistance is in many cases a desirable addition I do not consider myself limited thereto so far as the broad invention is concerned.

By the term "electrolytic condenser" I wish to be understood to mean any condenser of that type, as opposed to the ordinary so-called electrostatic condenser. An electrolytic condenser may be described broadly, in its commonest form, as being one consisting of two or more electrodes immersed in an electrolyte, but the concrete forms of the devices may vary widely.

In certain of the claims I have specified that "like devices" are "in series with each other". I do not mean by this that the current necessarily flows from one to the other. In fact if the terminals of the devices were spaced the same distance apart as the pole-pitch of the primary there would be at times no current flowing from one to another. But I mean rather, in the claims referred to, that the end of one device is connected to the beginning of another. In other claims I have specified that the devices are connected to the secondary winding or windings "at fixed points relative thereto", by which I mean that the points of connection do not shift in every revolution of the rotor, as would be the case if the connections were made through a commutator.

Special reference has been made throughout to "squirrel cage" or "bar windings", and only windings of this kind are shown in the drawings. But it is to be understood that the invention is not limited thereto, but is in fact applicable to all other types of windings as well.

It will be evident from the foregoing that by means of my invention it is possible to produce a motor whose performance will be comparable to or even better than that of one having resistance in its secondary which is cut out as the speed increases; and this without the employment of switches or actuating devices of any kind, though it will be understood that such devices may be used in addition if desired. It is also evident that in a motor embodying my invention it is possible to obtain torques considerably greater than could be obtained under similar conditions in a motor having secondary rheostatic control.

Having now described my invention, what I claim is:

1. In an alternating current machine of the induction type, a secondary element having a winding or windings, and one or more condensers, resistances, and impedances, connected with the secondary winding or windings, as set forth.

2. In an alternating current machine of the induction type, a secondary element having a winding or windings, and one or more impedances and electrolytic condensers connected with the secondary winding or windings at fixed points relative thereto, as set forth.

3. In an alternating current machine of the induction type, a secondary element having a winding or windings, and one or more impedances, resistances, and electrolytic condensers connected with the secondary winding or windings, as set forth.

4. In an alternating current machine of the induction type, a secondary element having a winding or windings, and one or more electrolytic condensers connected with the secondary winding or windings at fixed points relative thereto, as set forth.

5. In an alternating current machine of the induction type, a secondary element having a winding or windings, and one or more condensers, resistances, and impedances, connected with the secondary winding or windings, like devices being connected in series with each other, as set forth.

6. In an alternating current machine of the induction type, a secondary element having a winding or windings, and one or more impedances and electrolytic condensers connected with the secondary winding or windings, like devices being connected in series with each other, as set forth.

7. In an alternating current machine of the induction type, a secondary element having a winding or windings, and one or more impedances, resistances, and electrolytic condensers connected with the secondary windings, like devices being connected in series with each other, as set forth.

8. In an alternating current machine of the induction type, a secondary element having a plurality of windings, and one or more condensers, one or more impedances, and one or more resistances, connected with different windings, as set forth.

9. In an alternating current machine of the induction type, a secondary element having a plurality of overlapping windings and one or more condensers, one or more impedances, and one or more resistances, connected with different windings, as set forth.

10. In an alternating current machine of the induction type, a secondary element having a plurality of windings, and a plurality of independent sets of condensers, impedances, and resistances, connected with separate windings, as set forth.

11. In an alternating current machine of the induction type, a secondary element having a plurality of overlapping windings, and a plurality of independent sets of condensers, impedances, and resistances, connected with different windings, as set forth.

12. In an alternating current machine of the induction type, the combination with the primary element, and means for varying the number of poles therein, of a secondary element having one or more sets of windings, and one or more electrolytic condensers connected with the secondary winding or windings, as set forth.

13. In an alternating current machine of the induction type, the combination with the primary element, and means for varying the number of poles therein, of a secondary element having one or more sets of squirrel cage windings, and one or more eletrolytic condensers connected with the secondary winding or windings, as set forth.

14. In an alternating current machine of the induction type, the combination with the primary element, and means for varying the number of poles therein, of a secondary element having one or more sets of windings, and one or more impedances, and one or more electrolytic condensers connected with the secondary winding or windings, as set forth.

15. In an alternating current machine of the induction type, the combination with the primary element, and means for varying the number of poles therein, of a secondary element having one or more sets of squirrel cage windings, and one or more impedances, and one or more electrolytic condensers connected with the secondary winding or windings, as set forth.

16. In an alternating current machine of the induction type, the combination with the primary element and means for varying the number of poles therein, of a secondary element having one or more sets of windings, and one or more condensers, impedances, and resistances, connected with the secondary winding or windings, as set forth.

17. In an alternating current machine of the induction type, the combination with the primary element, and means for varying the number of poles therein, of a secondary element having one or more sets of squirrel cage windings, and one or more condensers, impedances, and resistances, connected with the secondary winding or windings, as set forth.

18. In an alternating current machine of the induction type, the combination with the primary element, and means for varying the number of poles therein, of a secondary element having a plurality of squirrel cage windings, the conductors thereof being spaced less distance apart than the pole-pitch of the primary element with its greatest number of poles, and a plurality of sets of impedances and electrolytic condensers, the said sets being connected with different secondary windings, as set forth.

19. In an alternating current machine of the induction type, the combination with the primary element, and means for varying the number of poles therein, of a secondary element having a plurality of overlapping squirrel cage windings, the conductors thereof being spaced less distance apart than the pole-pitch of the primary with its greatest number of poles, and a plurality of sets of impedances and electrolytic condensers, the said sets being connected with different secondary windings, as set forth.

20. In an alternating current machine of the induction type, the combination with the primary element and means for varying the number of poles therein, of a secondary element having a plurality of overlapping squirrel cage windings, the conductors thereof being spaced less distance apart than the pole-pitch of the primary element with the greatest number of poles, and a plurality of sets of impedances, resistances, and electrolytic condensers, the said sets being connected with different secondary windings, as set forth.

21. In an alternating current machine of the induction type, a secondary element having a plurality of windings, one having relatively low inductance, another having relatively high resistance, and capacity in one or more of the plurality of windings, as set forth.

22. In an alternating current machine of the induction type, a secondary element having a plurality of windings, one having relatively high inductance, another having relatively high resistance, and a third having relatively high capacity, as set forth.

23. In an alternating current machine of the induction type, a secondary element having a plurality of windings, one having relatively high inductance and low resistance, another having relatively low inductance and high resistance, and capacity in one or more of the plurality of windings, as set forth.

24. In an alternating current machine of the induction type, a secondary element having a plurality of windings, one having relatively high inductance and low resistance, another having relatively low inductance and high resistance, and a third having relatively high capacity, as set forth.

RALPH D. MERSHON.

Witnesses:
S. S. DUNHAM,
M. LAWSON DYER.